(12) United States Patent
Zachau et al.

(10) Patent No.: US 7,300,896 B2
(45) Date of Patent: Nov. 27, 2007

(54) GLASS CERAMIC AND METHOD OF PRODUCING THE SAME

(75) Inventors: Thilo Zachau, Buerstadt-Riedrode (DE); Rainer Liebald, Nauheim (DE); Dirk Sprenger, Stadecken-Elsheim (DE); Meike Lohmann, Taunusstein (DE)

(73) Assignee: Schott AG, Mainz (DE)

( * ) Notice: Subject to any disclaimer, the term of this patent is extended or adjusted under 35 U.S.C. 154(b) by 351 days.

(21) Appl. No.: 10/953,693

(22) Filed: Sep. 29, 2004

(65) Prior Publication Data

US 2005/0096208 A1    May 5, 2005

(30) Foreign Application Priority Data

Sep. 30, 2003  (DE) .................. 103 46 197

(51) Int. Cl.
*C03C 10/02* (2006.01)
*C03C 10/08* (2006.01)

(52) U.S. Cl. ............................. 501/9; 501/10
(58) Field of Classification Search .................. 501/9, 501/10
See application file for complete search history.

(56) References Cited

U.S. PATENT DOCUMENTS

| | | | |
|---|---|---|---|
| 3,117,881 A | 1/1964 | Henry et al. | |
| 5,491,116 A | 2/1996 | Beall et al. | |
| 5,968,857 A | 10/1999 | Pinckney | |
| 6,197,429 B1 | 3/2001 | Lapp et al. | |
| 6,376,402 B1 | 4/2002 | Pannhorst et al. | |
| 6,458,729 B1 | 10/2002 | Nagata et al. | |
| 6,458,730 B1 | 10/2002 | Nagata et al. | |
| 6,495,480 B1 | 12/2002 | Goto | |
| 6,569,791 B1 | 5/2003 | Nagata et al. | |
| 6,583,077 B1 | 6/2003 | Nagata et al. | |

FOREIGN PATENT DOCUMENTS

| | | |
|---|---|---|
| EP | 0 106 710 | 4/1984 |
| EP | 0 939 395 A1 | 9/1999 |
| EP | 0 939 396 A1 | 9/1999 |
| EP | 0 941 973 A2 | 9/1999 |
| EP | 1 067 102 A2 | 1/2001 |
| JP | 09 263424 | 7/1997 |
| JP | 9-263424 | * 10/1997 |
| JP | 2000302475 | * 10/2000 |

OTHER PUBLICATIONS

George H. Beall, Linda R. Pinckney; "Nanophase Glass-Ceramics"; J. Am. Ceram. Soc., 82 (1) 1999; pp. 5-16.
Golubkov et al.; "On the Phase Separation and Crystallization of Glasses in the $MgO-Al_2O_3-SiO_2-TiO_2$ System"; Glass Pys. Chem.; 29/3 (2003) pp. 254-266.

* cited by examiner

*Primary Examiner*—Karl Group
(74) *Attorney, Agent, or Firm*—Harness, Dickey & Pierce, P.L.C.

(57) ABSTRACT

A glass ceramic comprises (in wt.-% on oxide basis): $SiO_2$ 35 to 60, $B_2O_3$>4 to 10, $P_2O_5$ 0 to 10, $Al_2O_3$ 16.5 to 40, $TiO_2$ 1 to 10, $Ta_2O_5$ 0 to 8, $Y_2O_3$ 0 to 6, $ZrO_2$ 1 to 10, MgO 6 to 20, CaO 0 to 10, SrO 0 to 4, BaO 0 to 8, ZnO 0 to 4, $SnO_2+CeO_2$ 0 to 4, $SO_4^{2-}+Cl^-$ 0 to 4, wherein the total content ($SnO_2+CeO_2+SO_4^{2-}+Cl^-$) is between 0.01 and 4 wt.-%. The glass ceramic may be processed by the float glass method, may be transparent and is, inter alia, suitable as a substrate for thin film semiconductors, in particular for display applications, solar cells etc.

43 Claims, No Drawings

GLASS CERAMIC AND METHOD OF PRODUCING THE SAME

BACKGROUND OF THE INVENTION

The present invention relates to a glass ceramic for use especially as a relatively thin substrate in the most various applications. These include, inter alia, the use as thin-film semiconductor substrates, especially as thin film silicon, and as substrate for display applications (thin film transistor TFT display substrate, back plate, transparent front plate, etc.), as solar cells and the like, and as hard disk substrate.

There have been known in the art alkali-free glass ceramics of the basic glass system $MgO$—$Al_2O_3$—$SiO_2$ (MAS System) with diverse admixtures in the form of glass-forming elements, network modifiers, intermediate oxides, nucleation agents and fluxing agents, which are obtained by tempering corresponding starting glass materials, whereby they are converted to materials with homogeneously distributed crystallites in a residual glass phase.

In this connection, there have been especially known numerous MAS glass ceramics for use as substrates for hard disk memories. Applications to be mentioned in this connection include, for example, U.S. Pat. No. 6,583,077; U.S. Pat. No. 5,968,857; U.S. Pat. No. 6,569,791; U.S. Pat. No. 6,458,730; U.S. Pat. No. 6,458,729; U.S. Pat. No 6,495,480; U.S. Pat. No. 5,491,116; EP 1 067 10; EP 0 941 973; EP 0 939 396 and EP 0 939 395.

The respective glass ceramic substrates partly contain admixtures of $TiO_2$, $P_2O_5$, $ZrO_2$ as nucleation agents for crystallization in given quantities. Further, alkaline earth oxides may be admixed in given quantities. The refining agents used in this connection are, as a rule, $Sb_2O_3$, $As_2O_3$ or $SnO_2$. In some instances, additions of boron oxide ($B_2O_3$) of up to 4 wt. % are also envisaged in this connection (compare EP-A-0 939 396 and EP-A-0 939 395). Quite a number of glass ceramic materials, with given composition ranges for that application, have been known also from EP 0 941 973. These glass ceramics are, however, free of boron oxide. The refining agent used is again $CeO_2$, $As_2O_3$ or $Sb_2O_3$.

Further, there must be mentioned different MAS glass ceramics used in connection with optical display means, such as LCDs (compare for example U.S. Pat. No. 6,197,429). As is generally known, the necessary transparency in the visual range of the electromagnetic spectrum (380 to 780 nm) can be achieved in this case by suitable control of the ceramization process so that the crystallite sizes are significantly smaller than the wavelengths of the respective light (i.e. smaller than approximately 300 nm) as in that case no diffusion of light will occur on the crystallites (compare Beall and Pinckney: "Nanophase Glass-Ceramics" J.Am-.Ceram.Soc., 82(1) [1999]5-16. ) The crystallite sizes are kept reasonably small by corresponding purposeful nucleation and controlled crystal growth.

According to the state of the art, crystal phases normally separated in glass ceramics of the MAS system are cordierite, spinel, sapphirine, mullite, enstatite or forsterite (or corresponding mixed crystals in a siliceous residual glass phase. It is understood that the composition of the glass ceramics described in the prior art vary over a broad range—in correspondence with the composition of the separated crystal phases and residual glass phases.

In order to achieve a uniform distribution of crystallite sizes in the separated crystal phases an optimally high number and optimally homogeneous distribution of nuclei is required, which are produced, according to the prior art, by thermally induced separation in the glass, followed by the formation of nanocrystallites. One introduces for this purpose into the glass so-called nucleation oxides ($TiO_2$, $ZrO_2$) either individually or in given mixing ratios. When heating up the glass, usually to temperatures above $T_g$, one starts out in the case of $TiO_2$ in the MAS system from the formation of Mg titanate nanocrystallites as nuclei for other crystal phases (compare Golubkov et. al.: "On the phase separation and crystallization of glasses in the $MgO$—$Al_2O_3$—$SiO_2$—$TiO_2$ system", Glass Phys. Chem., 29/3 [2003] 254-266).

When the glass ceramics are to be used as self-supporting substrates, main importance is placed on properties such as high breaking strength and a high modulus of elasticity (specific stiffness: $E/\rho$). These properties can be influenced depending on the composition of the residual glass phase and the separated crystal phases and on the crystal phase proportions. In most of the cases, it is desired to achieve a specific stiffness of 30 to 50 MJ/kg. the MAS system glass ceramics heretofore known in the art usually have a thermal expansion coefficient of approximately 2 to $6 \times 10^{-6}$/K in the temperature range of between 30 and 300° C.

MAS glass ceramics are presently in a development stage also as substrate for thin film silicon as base for active devices in integrated circuits, such as diodes or thin film transistors (TFT). By the use of substrate-based thin film silicon it is possible to produce components for flat screen displays (such as LCDs) and solar cells for generation of electric current and the like.

At present, it is predominantly amorphous thin film silicon (a-Si) that is applied on substrates. The temperatures required for the processes of depositing the amorphous thin film silicon on the substrates usually lie in the range of approximately 450° Celsius. The use of polycrystalline thin film silicon (poly-Si) in the respective components would present some decisive advantages compared with a-Si components, the poly-Si having a clearly higher electron mobility. For example, resolution and reaction speed of an LCD could be significantly increased. Further, this opens up new ways of on-board integration of additional integrated circuits installed, in the case of a-Si devices, on the edge of the LCDs, for example in the form of extra chips. Poly-Si is obtained in the art by recrystallization of a-Si on the substrate. In principle, this process is realized by heating the Si layer up to temperatures at which the a-Si crystallizes. One differentiates in this connection between low temperature poly-SI, which is obtained by heating the Si layer up locally to 600° Celsius, and high temperature poly-Si formed at process temperatures of approximately proximately 900° Celsius. For purposes of producing such poly-Si articles, either the entire component is heated up to the respective temperature (HT poly-Si), or else the desired temperatures are brought about locally by moving an excimer laser across the surface (the surface layer) in a corresponding raster pattern. The poly-Si of the components produced by the last-mentioned process frequently is not uniform. Such components may, for example, show so-called "pinpoint defects", which are undesirable. In order to reach the same degree of integration as in the case of high-temperature poly-Si, low-temperature poly-Si components must be processed for a long time, usually over more than 20 hours.

Given the fact that in order to achieve a high degree of integration of the transistors a plurality of photolithographic processes are required, the poly-Si component must of course stand the temperature of the recrystallization cycles without essential changes in geometry (shrinkage) so that misalignments among the superimposed layers and with contact points, if any, are avoided. Usually, the shrinkage tolerance is a fraction only of the lateral extension of the smallest circuit unit implemented; compared with the entire substrate it is frequently limited to 50 ppm. In order to avoid stresses between the substrate and the Si layer, the coefficient of thermal expansion of the two materials must be adapted, or must be equal. The poly-Si components, heretofore only suited for use in poly-Si components, consist of amorphous $SiO_2$ (silica glass) and are complex and costly to produce. In addition, the difference between the coefficients of thermal expansion of poly-Si and silica glass is approximately $\Delta\alpha_{30-300} \approx 3.2 \times 10^{-7}/K$.

In these cases, MAS glass ceramics designed specifically to the desired properties would provide on the one hand technical improvements and, on the other hand, considerable cost savings.

In this regard, for example U.S. Pat. Nos. 5,968,857 and 6,197,429 have become known.

None of the afore-mentioned glass ceramics considers, for example, the specific demands to be met in producing such glass ceramics in the form of plates with the smallest possible thickness.

It is, therefore, a first object of the present invention to provide a glass ceramic which is suited as a substrate for optical and electronic components.

It is a second object of the invention to disclose a glass ceramic which can be produced with high precision and high homogeneity even in small thicknesses, and this even in the case of large surface areas.

It is a third object of the invention to disclose a glass ceramic having a high specific modulus of elasticity and advantageous mechanical properties.

It is a fourth object of the invention to disclose a glass ceramic having a coefficient of thermal expansion that is controllable in a suitable way to allow the material to be used as a substrate for polysilicon.

It is a fifth object of the invention to disclose a glass ceramic that is transparent, if desired for certain applications.

Finally, a suitable production method for such glass ceramics is to be provided.

SUMMARY OF THE INVENTION

According to the invention, these and other objects of the invention are achieved by a glass ceramic comprising the following components:

| | |
|---|---|
| $SiO_2$ | 35-60 |
| $B_2O_3$ | >4-10 |
| $P_2O_5$ | 0-10 |
| $Al_2O_3$ | 16.5-40 |
| $TiO_2$ | 1-10 |
| $Ta_2O_5$ | 0-8 |
| $Y_2O_3$ | 0-6 |
| $ZrO_2$ | 1-10 |
| MgO | 6-20 |
| CaO | 0-10 |
| SrO | 0-4 |
| BaO | 0-8 |
| ZnO | 0-4 |
| $SnO_2 + CeO_2$ | 0-4 |
| $SO_4^{2-} + Cl^-$ | 0-4, | wherein the sum of $SnO_2$, $CeO_2$, $SO_4^{2-}$ and $Cl^-$ $\Sigma(SnO_2, CeO_2, SO_4^{2-}, Cl^-)$ is between 0.01 wt.-% and 4 wt.-%.

The object of the invention is thereby perfectly achieved.

This is so because it is possible according to the invention to initially melt and refine a starting glass of the respective composition and to then form that glass by a float glass process into glass plates of high surface precision and minimum variations in thickness. Even thin thicknesses of less than 2 mm can be realized in this way without difficulty.

With respect to the method, the object of the invention is achieved by a method for producing glass ceramics comprising the steps of initially melting a starting glass comprising the following components (in wt.-% on oxide basis):

| | |
|---|---|
| $SiO_2$ | 35-60 |
| $B_2O_3$ | >4-10 |
| $P_2O_5$ | 0-10 |
| $Al_2O_3$ | 16.5-40 |
| $TiO_2$ | 1-10 |
| $Y_2O_3$ | 0-6 |
| $ZrO_2$ | 1-10 |
| MgO | 6-20 |
| CaO | 0-10 |
| SrO | 0-4 |
| BaO | 0-8 |
| ZnO | 0-4 |
| $SnO_2 + CeO_2$ | 0-4 |
| $SO_4^- + Cl^-$ | 0-4, | wherein the sum of $SnO_2$, $CeO_2$, $S_4^{2-}$ and $Cl^-$ $\Sigma(SnO_2, CeO_2, S_4^{2-}, Cl^-)$ is between 0.01 wt.-% and 4 wt.-%.

The glass ceramic according to the invention can be formed especially by the float glass method before the ceramization program is carried out for converting the starting glass to a glass ceramic. It is, however, understood that the invention may as well be used in combination with other forming methods, for example drawing methods.

According to a preferred further development of the invention, the glass ceramic comprises the following components (in wt.-% on oxide basis):

| | |
|---|---|
| $SiO_2$ | 39-55 |
| $B_2O_3$ | >4-8 |
| $P_2O_5$ | 0-6 |
| $Al_2O_3$ | 16.5-32 |
| $TiO_2$ | 1-<7 |
| $Ta_2O_5$ | 0-5 |
| $Y_2O_3$ | 0-5 |
| $ZrO_2$ | 1-6 |
| MgO | >8-20 |
| CaO | 0-6 |
| SrO | 0-2.5 |
| BaO | 0-5 |
| ZnO | 0-2 |
| $SnO_2 + CeO_2$ | 0-4 |
| $SO_4^{2-}$ | 0-2 |
| $Cl^-$ | 0-2. |

In order to reach a high modulus of elasticity in combination with a low density, the content of aluminium oxide should be at least 16.5 wt.-%. Further, admixtures of $Y_2O_3$ likewise lead to a higher modulus of elasticity, especially when crystal phases containing yttrium (for example Y-xenotime—$YPO_4$, Yttrium pyrosilicate—$Y_2Si_2O_7$ or Yttropyrochlorite—$Y_2Ti_2O_7$) are separated, whereby the modulus of elasticity increases by approximately 2 GPa per wt.-% of $Y_2O_3$.

A coefficient of thermal expansion, in a temperate range of between 30 and 300° Celsius, of $\alpha_{30\ldots300} < 5 \times 10^{-6}/K$, preferably $\alpha_{30\ldots300} < 4 \times 10^{-6}/K$, most preferably $\alpha_{30\ldots300} < 3.7 \times 10^{-6}/K$ is determined by the kind and proportions of the separated crystal phases between each other and relative to the residual glass phase, and may be influenced by the ceramization program, especially through heating ramps, holding temperatures and cooling ramps. Heating up and holding is effected especially at temperatures at which the crystal phases spinel, sapphirine und cordierite (or corresponding mixed crystals) are separated. To ensure preferred separation of exactly those crystal phases, the proportions of the oxides $SiO_2$, MgO and $Al_2O_3$ may be of some importance. These are, preferably, (in wt.-%):

$SiO_2/\Sigma(SiO_2, Al_2O_3, MgO)$ 0.48 to 0.62, more preferably 0.50 to 0.60

$Al_2O_3/\Sigma(SiO_2, Al_2O_3, MgO)$ 0.185 to 0.355, more preferably 0.20 to 0.25

$MgO/\Sigma(SiO_2, Al_2O_3, MgO)$ 0.11 to 0.21, more preferably 0.16 to 0.21.

The respective crystal phase separation temperatures and the relevant holding times can be determined by analytical methods known as such (for example differential thermoanalysis (DTA) or high-temperature x-ray diffraction (HT-XRD)).

Good glass stability of the starting glass in case of the relatively low $SiO_2$ content of the glass ceramics according to the invention can be assisted by mixed alkaline earth effects. In this case, one preferably adds MgO, CaO, SrO and BaO in the following proportions:

MgO/(CaO+SrO+BaO)>2 to 10, more preferably >3, most preferably >5.

$B_2O_3$, added at a ratio of over 4 wt.-%, and ZnO also belong to the group of fluxing agents. The proportion of alkaline earth oxides, together with the components $B_2O_3$ and, if present, ZnO produce the effect that at least one of those fluxing agents (SrO) remains completely, and the rest remain at least in part, in the residual glass phase of the glass ceramics, thereby acting to stabilize the residual glass phase against separation of undesirable crystal phases, such as α-quartz.

The content of ZnO preferably is 2 wt.-% max, as higher ZnO proportions may have a negative effect on the forming process preferred for the starting glass, i.e. the process of floating on a liquid Sn bath. It has been found in this connection that ZnO especially tends to vaporize and to cause glass defects, or is reduced in the forming gas atmosphere of the floating unit, thereby forming an alloy with the tin of the floating bath. For the same reason, the starting glass of the glass ceramics preferably should contain no fluoride, PbO, $As_2O_3$, $Sb_2O_3$ and $MoO_3$. Although barium oxide may in principle be contained, it preferably is not added because of its great contribution to the overall density of the glass ceramics and, thus, because of its corresponding lowering effect on the specific modulus of elasticity.

A high temperature resistance of the glass ceramics according to the invention in the range of at least 800° Celsius, preferably of at least 850° Celsius and even more preferably of at least 900° Celsius, is achieved depending on the composition of the starting glass and the ceramization program. That product-relevant value is determined predominantly by the crystal phase proportions and by the viscosity of the residual glass in the before-mentioned temperature range. The crystal phase proportions can be controlled through the quantity of separated crystallites and are, consequently, dependent on the content of nucleation agents. Proportions of nucleation agents ($\Sigma(P_2O_5$, $TiO_2$, $ZrO_2$, $SnO_2$, $Ta_2O_5$) in the range of 0.01 to 20 wt.-%, preferably 6 to 16.5 wt.-%, more preferably in the range of 5 to 12 wt.-%, have been found to be advantageous. The $TiO_2$ content should not exceed 7 wt.-% as otherwise there would be a risk of separation of the crystal phase rutile during the ceramization process. This is undesirable as it would impair the transparency of the glass ceramics. On the other hand, the $TiO_2$ content should not be below 1 wt.-% as otherwise the number of nuclei would be insufficient to achieve the homogeneous, compact-grained structure with crystallites, preferably 300 nm, necessary for the desired transparency. Another nucleation agent used may be $Ta_2O_5$, which provides the advantage that it does not have a coloring effect, not even in combination with other elements (for example Fe, Zn).

In addition to its function as a nucleation agent $SnO_2$ presents itself as a useful and, especially, float-compatible refining agent so that an $SnO_2$ content of up to 4 wt.-% is possible. Another float-compatible refining agent is $CeO_2$, which can be used alternatively or in addition to $SnO_2$. Mixed sulphate/chloride refining is likewise possible, provided the raw materials of the glass are introduced in part as sulphates or chlorides, respectively. All in all, the sum of $SnO_2$, $CeO_2$, $SO_4^{2-}$, $Cl^-$ is, thus, between 0.01 und 4 wt.-%. To the extent $SnO_2$ or $CeO_2$ are used as refining agents, the total content is in this case preferably between 0.1 und 1 wt.-%, more preferably between 0.2 und 0.5 wt.-%. If sulphate and chloride are used as refining agents, sulphate and chloride ions, respectively, are added in proportions of up to 2 wt.-%.

EXAMPLES

Examples 1 to 7 are summarized in tables 1 and 2 (data relate to the starting glasses).

The respective starting glass materials of the glass ceramics were molten at temperatures of approximately 1600° Celsius (introduction of mixtures of oxides, carbonates, sulphates, chlorides or nitrides of the elements corresponding to the specified composition over approximately 1 h/kg of batch mix) and were cast after a settling and refining time of approximately 2 hours. The glasses were then annealed for a time of 1 hr. at temperatures of $T_g$+10 K and were slowly cooled down at a rate of 60 K/h.

These starting glasses were then converted to glass ceramics by a usually multistage temperature treatment.

In example 1, for example, ceramization was brought about by the following temperature program:

Heating up at 5 K/min to 770° Celsius, holding at 770° Celsius for 2 hours, heating up at 5K/min to 865° Celsius, holding at 865° Celsius for 2 hours, cooling down to room temperature.

The crystal phases analyzed in this case were: Cordierite as main phase and $TiZrO_4$ and Mg/beta-quartz mixed crystal as secondary phases. With respect to the glass ceramics, the following properties were measured:

| Density | 2.693 g/cm³ |
|---|---|
| Modulus of elasticity | 98 ± 3 GPa |
| E/ρ | 36.4 MJ/kg |
| CTE (30-300) | 4.0 × 10⁻⁶/K. |

In examples 6 and 7, ceramization was effected as follows:
Heating up to nucleation temperature at 5K/min
Holding for 4 h
Heating up to crystal growth temperature of 900° C. at 3 K/h, holding for 1 h
Cooling down to 850° C. at 15 K/h (0.25 K/min)
Cooling down to 750° C. at 60 K/h (1 K/min)
Cooling down to RT.
With respect to the glass ceramics, the following properties were measured:

|  | Example 6 | Example 7 |
|---|---|---|
| Density | 2.68 g/cm³ | 2.68 g/cm³ |
| Modulus of elasticity | 120 ± 3 GPa | 118 ± 3 GPa |
| E/ρ | 44.8 MJ/kg | 44 MJ/kg |

The crystal phases determined were cordierite and Mg/beta-quartz mixed crystal as main phases and spinel as secondary phase.

The remaining samples were ceramized as follows:
Nucleation at temperatures around $T_g$+(30 to 70 K)
Holding times between 60 and 240 min
Crystal growth at the temperatures of the corresponding crystallization peaks
Holding times between 30 and 240 min.

Heating rates are usually in the range of 1 to 15 K/min, preferably between 3 and 10 K/min.

As has been mentioned before, the respective holding temperatures for nucleation and crystal growth can be determined by known methods, for example by DTA curves.

TABLE 1

| | Example No. | | | | | |
|---|---|---|---|---|---|---|
| | 1 | | 2 | | 3 | |
| | mol-% | wt.-% | mol-% | wt.-% | mol-% | wt.-% |
| $SiO_2$ | 49.78 | 44.00 | 49.39 | 44.93 | 53.19 | 49.28 |
| $B_2O_3$ | 4.88 | 5.00 | 7.16 | 7.55 | 6.13 | 6.58 |
| $P_2O_5$ | 2.63 | 5.50 | 2.05 | 4.40 | | |
| $Al_2O_3$ | 12.67 | 19.00 | 12.57 | 19.40 | 13.39 | 21.06 |
| $TiO_2$ | 4.25 | 5.00 | 1.53 | 1.86 | 1.00 | 1.23 |
| $Y_2O_3$ | | | 0.51 | 1.75 | | |
| $ZrO_2$ | 2.76 | 5.00 | 1.53 | 2.86 | 1.00 | 1.90 |
| MgO | 18.55 | 11.00 | 20.92 | 12.77 | 22.36 | 13.90 |
| CaO | 1.80 | 1.50 | 3.07 | 2.64 | | |
| SrO | 0.98 | 1.50 | | | | |
| BaO | | | | | 1.92 | 4.55 |
| ZnO | 1.25 | 1.50 | 1.02 | 1.26 | 0.79 | 0.99 |
| $SnO_2 + CeO_2$ | 0.45 | 1.00 | 0.25 | 0.58 | 0.22 | 0.51 |
| Σ | 100.00 | 100.00 | 100.00 | 100.00 | 100.00 | 100.00 |
| $Al_2O_3/(SiO_2 + Al_2O_3 + MgO)$ | | 0.2568 | | 0.2516 | | 0.2500 |
| $SiO_2/(SiO_2 + Al_2O_3 + MgO)$ | | 0.5946 | | 0.5827 | | 0.5850 |
| $MgO/(SiO_2 + Al_2O_3 + MgO)$ | | 0.1486 | | 0.1656 | | 0.1650 |
| $MgO/(CaO + SrO + BaO)$ | | 3.6667 | | 4.8371 | | 3.0549 |
| $P_2O_5 + TiO_2 + ZrO_2 + CeO_2 + SnO_2$ | | 16.5000 | | 9.7000 | | 3.6400 |
| | Tg(DTA) | 725 ± 3 °C. | Tg(DTA) | 718 ± 3 °C. | Tg(DTA) | 740 ± 3 °C. |
| | Density glassy: | 2.69 g/cm³ | Density glassy: | 2.753 g/cm³ | Density glassy: | 2.652 g/cm³ |
| | E glassy | 102 ± 3 GPa | E glassy | 104 ± 3 GPa | E glassy | 103 ± 3 GPa |
| | E/ρ glassy | 37.9 MJ/kg | E/ρ glassy | 37.8 MJ/kg | E/ρ glassy | 38.8 MJ/kg |
| | CTE (30-300) | 3.98 ppm/K | CTE (30-300) | 4.64 ppm/K | CTE (30-300) | 4.2 ppm/K |
| | | | $K_1C$ | 1 ± 0.03 MPam$^{1/2}$ | | |

TABLE 2

| | Example No. | | | | | | | |
|---|---|---|---|---|---|---|---|---|
| | 4 | | 5 | | 6 | | 7 | |
| | mol-% | wt.-% | mol-% | wt.-% | mol-% | wt.-% | mol-% | wt.-% |
| $SiO_2$ | 54.90 | 51.71 | 55.10 | 51.71 | 53.82 | 52.82 | 54.85 | 51.71 |
| $B_2O_3$ | 4.23 | 4.61 | 4.23 | 4.61 | 4.21 | 4.79 | 4.21 | 4.61 |
| $P_2O_6$ | | | 0.45 | 1.00 | | | 0.45 | 1.00 |
| $Al_2O_3$ | 13.82 | 22.09 | 13.87 | 22.09 | 9.99 | 16.64 | 13.80 | 22.09 |
| $TiO_2$ | 1.00 | 1.25 | 1.00 | 1.25 | 1.00 | 1.30 | 1.00 | 1.25 |
| $Y_2O_3$ | | | | | | | | |
| $ZrO_2$ | 1.00 | 1.92 | 1.00 | 1.92 | 0.99 | 2.00 | 0.99 | 1.92 |
| MgO | 23.08 | 14.58 | 23.16 | 14.58 | 28.03 | 18.46 | 23.05 | 14.58 |
| CaO | | | | | | | | |

TABLE 2-continued

| | Example No. | | | | | | | |
|---|---|---|---|---|---|---|---|---|
| | 4 | | 5 | | 6 | | 7 | |
| | mol-% | wt.-% | mol-% | wt.-% | mol-% | wt.-% | mol-% | wt.-% |
| SrO | | | | | | | 1.43 | 2.33 |
| BaO | 0.97 | 2.33 | 0.975 | 2.33 | 0.97 | 2.42 | | |
| ZnO | 0.78 | 1.00 | | | 0.77 | 1.04 | | |
| $SnO_2 + CeO_2$ | 0.22 | 0.51 | 0.22 | 0.51 | 0.22 | 0.53 | 0.22 | 0.51 |
| Σ | 100.00 | 100.00 | 100.00 | 100.00 | 100.00 | 100.00 | 100.00 | 100.00 |
| $Al_2O_3/(SiO_2 + Al_2O_3 + MgO)$ | | 0.2499 | | 0.2499 | | 0.1893 | | 0.2499 |
| $SiO_2/(SiO_2 + Al_2O_3 + MgO)$ | | 0.5851 | | 0.5851 | | 0.6008 | | 0.5851 |
| $MgO/(SiO_2 + Al_2O_3 + MgO)$ | | 0.1650 | | 0.1650 | | 0.2100 | | 0.1650 |
| $MgO/(CaO + SrO + BaO)$ | | 6.2575 | | 6.2575 | | 7.6281 | | 6.2575 |
| $P_2O_5 + TiO_2 + ZrO_2 + CeO_2 + SnO_2$ | | 3.6800 | | 4.6800 | | 3.8300 | | 4.6800 |

| | Ex. 4 | | Ex. 5 | | Ex. 6 | | Ex. 7 | |
|---|---|---|---|---|---|---|---|---|
| Tg(DTA) | 758 ± 3 | °C. | 752 ± 3 | °C. | 745 ± 3 | °C. | 755 ± 3 | °C. |
| Density glassy: | 2.635 | g/cm³ | 2.651 | g/cm³ | 2.615 | g/cm³ | 2.614 | g/cm³ |
| E glassy | 106 ± 3 | GPa | 104 ± 3 | GPa | 100 ± 3 | GPa | 111 ± 3 | GPa |
| E/ρ glassy | 40.2 | MJ/kg | 39.2 | MJ/kg | 42.4 | MJ/kg | 38.2 | MJ/kg |
| CTE (30-300) | | ppm/K | | ppm/K | | ppm/K | | ppm/K |

The invention claimed is:

1. A glass ceramic comprising the following components (in wt.-% on oxide basis):

| | |
|---|---|
| $SiO_2$ | 35-60 |
| $B_2O_3$ | >4-10 |
| $P_2O_5$ | 0-10 |
| $Al_2O_3$ | 16.5-40 |
| $TiO_2$ | 1-10 |
| $Ta_2O_5$ | 0-8 |
| $Y_2O_3$ | 0-6 |
| $ZrO_2$ | 1-5 |
| MgO | 6-20 |
| CaO | 0-10 |
| SrO | 0-4 |
| BaO | 0-8 |
| ZnO | 0-4 |
| $SnO_2 + CeO_2$ | 0-4 |
| $SO_4^{2-} + Cl^-$ | 0-4, | wherein the total content of $SnO_2$, $CeO_2$, $SO_4^{2-}$ and $Cl^-$ Σ($SnO_2$, $CeO_2$, $SO_4^{2-}$, $Cl^-$) is between 0.01 wt.-% and 4 wt.-%; the glass ceramic having at most 0.5 wt % alkali metal oxides Σ($Li_2O$, $Na_2O$, $K_2O$, $Rb_2O$, $Cs_2O$).

2. The glass ceramic of claim 1, comprising the following components (in wt.-% on oxide basis):

| | |
|---|---|
| $SiO_2$ | 39-55 |
| $B_2O_3$ | >4-8 |
| $P_2O_5$ | 0-6 |
| $Al_2O_3$ | 16.5-32 |
| $TiO_2$ | 1-<7 |
| $Ta_2O_5$ | 0-5 |
| $Y_2O_3$ | 0-5 |
| $ZrO_2$ | 1-5 |
| MgO | >8-20 |
| CaO | 0-6 |
| SrO | 0-2.5 |
| BaO | 0-5 |
| ZnO | 0-2 |
| $SnO_2 + CeO_2$ | 0-4 |
| $SO_4^{2-}$ | 0-2 |
| $Cl^-$ | 0-2; | the glass ceramic being essentially free of alkali metal oxides.

3. The glass ceramic of claim 1, wherein the total content Σ($P_2O_5$, $TiO_2$, $ZrO_2$, $SnO_2$, $Ta_2O_5$) is between 2 wt.-% and 20 wt.-%.

4. The glass ceramic of claim 3, wherein the total content Σ($P_2O_5$, $TiO_2$, $ZrO_2$, $CeO_2$, $SnO_2$, $Ta_2O_5$) is between 3 wt.-% and 16.5 wt.-%.

5. The glass ceramic of claim 4, wherein the total content Σ($P_2O_5$, $TiO_2$, $ZrO_2$, $CeO_2$, $SnO_2$, $Ta_2O_5$) is between 5 wt.-% and 12 wt.-%.

6. The glass ceramic of claim 1, wherein the ratio $SiO_2$/Σ($SiO_2$, $Al_2O_3$, MgO) is between 0.48 and 0.62, based on percent by weight.

7. The glass ceramic of claim 6, wherein the ratio $SiO_2$/Σ($SiO_2$, $Al_2O_3$, MgO) is between 0.50 and 0.60, based on percent by weight.

8. The glass ceramic of claim 1, wherein the ratio $Al_2O_3$/Σ($SiO_2$, $Al_2O_3$, MgO) is between 0.185 and 0.355, based on percent by weight.

9. The glass ceramic of claim 8, wherein the ratio $Al_2O_3$/Σ($SiO_2$, $Al_2O_3$, MgO) is between 0.20 and 0.25, based on percent by weight.

10. The glass ceramic of claim 1, wherein the ratio MgO/Σ($SiO_2$, $Al_2O_3$, MgO) is between 0.11 and 0.21, based on percent by weight.

11. The glass ceramic of claim 10, wherein the ratio MgO/Σ($SiO_2$, $Al_2O_3$, MgO) is between 0.16 and 0.21, based on percent by weight.

12. The glass ceramic of claim 1, wherein the ratio MgO/Σ(CaO, SrO, BaO) is greater than 2 and 10 at the most, based on percent by weight.

13. The glass ceramic of claim 12, wherein the ratio MgO/Σ(CaO, SrO, BaO) is greater than 3, based on percent by weight.

14. The glass ceramic of claim 12, wherein the ratio MgO/Σ(CaO, SrO, BaO) is greater than 5, based on percent by weight.

15. The glass ceramic of claim 1, which except for accidental impurities does not contain any $Fe_2O_3$, $Cr_2O_3$, $Co_2O_3$, CuO, NiO, $V_2O_5$, $Ag_2O$, $MoO_3$.

16. The glass ceramic of claim 1, which except for accidental impurities does not comprise any fluoride, PbO, $As_2O_3$ and $Sb_2O_3$.

17. The glass ceramic of claim 1, wherein the total content of $SnO_2$ and $CeO_2$ Σ($SnO_2$, $CeO_2$) is at least 0.1 and 1.0 wt.-% at the most.

18. The glass ceramic of claim 1, which comprises essentially no barium oxide.

19. The glass ceramic of claim 1, which is ceramized by thermal treatment of a starting glass and which comprises as a main crystal phase at least one component selected from the group formed by spinel, sapphirine, cordierite and mixed crystals thereof.

20. The glass ceramic of claim 1, which is ceramized by thermal treatment of a starting glass and which comprises a crystal phase comprising yttrium.

21. The glass ceramic of claim 1, which has a specific modulus of elasticity greater than 30 MJ/kg.

22. The glass ceramic of claim 21, which has a specific modulus of elasticity greater than 35 MJ/kg.

23. The glass ceramic of claim 21, which has a specific modulus of elasticity greater than 42 MJ/kg.

24. The glass ceramic of claim 1, which has a modulus of elasticity greater than 100 GPa.

25. The glass ceramic of claim 24, which has a modulus of elasticity greater than 110 GPa.

26. The glass ceramic of claim 1, which in the temperature range of 30 to 300° C. has a coefficient of thermal expansion (CTE) of $6 \times 10^{-6}$/K at the most.

27. The glass ceramic of claim 1, which in the temperature range of 30 to 300° C. has a coefficient of thermal expansion (CTE) between $2 \times 10^{-6}$/K and $6 \times 10^{-6}$/K.

28. The glass ceramic of claim 1, which in the temperature range of 30 to 300° C. has a coefficient of thermal expansion (CTE) of $4 \times 10^{-6}$/K at the most.

29. The glass ceramic of claim 1, which in the temperature range of 30 to 300° C. has a coefficient of thermal expansion (CTE) of $3.7 \times 10^{-6}$/K at the most.

30. The glass ceramic of claim 1, which is temperature-resistant up to at least 700° C.

31. The glass ceramic of claim 1, which is temperature-resistant up to at least 800° C.

32. The glass ceramic of claim 1 having a residual glass phase comprising alkaline earth oxides.

33. The glass ceramic of claim 1, which is optically transparent.

34. The glass ceramic of claim 33, which is made of a floated glass transformed into said glass ceramic by heat treating.

35. A semiconductor substrate comprising a glass ceramic according to claim 1.

36. A hard disk memory substrate comprising a glass ceramic according to claim 1.

37. An optical display having a transparent substrate comprising a glass ceramic according to claim 1.

38. A semiconductor device having at least one substrate comprising a glass ceramic according to claim 1.

39. The semiconductor device of claim 38 which is configured as a diode.

40. The semiconductor device of claim 38 which is configured as a thin film transistor.

41. A flat screen display comprising at least one substrate comprising a glass ceramic according to claim 1.

42. A light-active semiconductor device comprising a substrate comprising a glass ceramic according to claim 1.

43. The light-active semiconductor device of claim 42 which is configured as a solar cell.

* * * * *

UNITED STATES PATENT AND TRADEMARK OFFICE
CERTIFICATE OF CORRECTION

PATENT NO. : 7,300,896 B2  Page 1 of 1
APPLICATION NO. : 10/953693
DATED : November 27, 2007
INVENTOR(S) : Thilo Zachau et al.

It is certified that error appears in the above-identified patent and that said Letters Patent is hereby corrected as shown below:

Title Page,
Item (75), line 4, "Lohmann" should be -- Schneider --.

Signed and Sealed this

Twenty-fourth Day of June, 2008

JON W. DUDAS
*Director of the United States Patent and Trademark Office*